US006557922B1

(12) United States Patent
Hommel

(10) Patent No.: US 6,557,922 B1
(45) Date of Patent: May 6, 2003

(54) FOLDABLE TOP

(76) Inventor: Edward S. Hommel, 250 Hidden Acres, Mc Veytown, PA (US) 17051

( * ) Notice: Subject to any disclaimer, the term of this patent is extended or adjusted under 35 U.S.C. 154(b) by 0 days.

(21) Appl. No.: 09/781,472

(22) Filed: Feb. 12, 2001

Related U.S. Application Data

(60) Provisional application No. 60/183,410, filed on Feb. 18, 2000.

(51) Int. Cl.[7] .................................................. B60J 7/08
(52) U.S. Cl. .............................. 296/107.17; 280/DIG. 5
(58) Field of Search ........................... 296/97.21, 77.1, 296/114, 122, 107.17, 107.02, 108, 109, 121, 107.11, 107.12, 107.15, 107.16; 280/DIG. 5, 657, 658; 114/361; 16/348, 357, 358, 359, 235, 236, 239

(56) References Cited

U.S. PATENT DOCUMENTS

| | | | | |
|---|---|---|---|---|
| 3,743,439 A | * | 7/1973 | Cann ........................... 415/206 |
| 4,650,238 A | * | 3/1987 | Healey .................. 280/DIG. 5 |
| 5,056,805 A | * | 10/1991 | Wang .......................... 280/658 |
| 5,451,072 A | * | 9/1995 | Weng .......................... 280/646 |
| 5,788,317 A | * | 8/1998 | Nation .................. 280/DIG. 5 |
| 5,842,732 A | * | 12/1998 | Daggett et al. ......... 296/107.17 |
| 5,857,684 A | * | 1/1999 | Liao et al. ..................... 280/40 |
| 6,126,227 A | * | 10/2000 | Bitelli ......................... 280/756 |
| 6,220,657 B1 | * | 4/2001 | Rea ....................... 296/216.03 |

* cited by examiner

Primary Examiner—D. Glenn Dayoan
Assistant Examiner—Jason Morrow
(74) Attorney, Agent, or Firm—John J. Elnitski, Jr.

(57) ABSTRACT

The present invention is a foldable top on a golf cart. The foldable top includes a top and a framework. The framework is attached to the golf cart and supports the top. The framework includes a front bottom frame, two front middle frames, two top frames, two rear middle frames, a rear bottom frame and a series of hinges. The hinges include two rotation members. Each of the rotation members includes a center hole, at least one positioning hole and a stud for attaching the rotation member to one of the frames. A center bolt is inserted into each of the center holes to rotatably connect the two rotation members of each hinge. Finally there is at least one positioning bolt inserted into at least one positioning hole of each of the rotation members to secure the two rotation members of each hinge in position.

16 Claims, 6 Drawing Sheets

FOLDABLE TOP

This application claims the benefit of U.S. Provisional Application Ser. No. 60/183,410 filed Feb. 18, 2000.

BACKGROUND

Golf carts have many uses other than providing transportation about a golf course. They are used at sporting venues, fairs and other events, There is a rental industry which has evolved to provide the golf carts for such events. In order to provide the golf carts to the events, the rental industry must transport the golf carts to the event. The most appropriate way to transport a large number of golf carts is to stack them on multi-level carrier or trailer. This present a problem as most golf carts include a top. The top provides shade from the sun and shelter from rain for the golf cart user. The top also prevents stacking of the golf carts on a multi-level carrier, as each level of the carrier is not tall enough to accommodate the golf cart with a top installed. So in order to transport the golf carts, the rental industry removes the tops from each golf cart before loading the golf cars on the carrier. The tops are then re-installed when the golf carts are unloaded from the carrier. Removal and re-installation of the tops requires man-hours and a separate vehicle to haul the tops, which all adds to the operating expenses of renting the golf carts. Also, when new golf carts are delivered to a dealer, they are delivered much in the same way that the rental industry transports golf carts. Therefore, movement of new golf carts to a dealer or golf course also requires the golf carts to be shipped with the tops removed. What is needed is a golf cart top which can be folded down in order to fit between the levels of the multi-level carrier.

It is an object of the present invention to provide a foldable top for a golf cart to address storage and transport issues involving golf carts.

SUMMARY OF THE INVENTION

The present invention is a foldable top on a golf cart. The foldable top includes a top and a framework. The framework is attached to the golf cart and supports the top. The framework includes a front bottom frame, two front middle frames, two top frames, two rear middle frames, a rear bottom frame and a series of hinges. The hinges include two rotation members. Each of the rotation members includes a center hole, at least one positioning hole and a stud for attaching the rotation member to one of the frames. A center bolt is inserted into each of the center holes to rotatably connect the two rotation members of each hinge. Finally there is at least one positioning bolt inserted into at least one positioning hole of each of the rotation members to secure the two rotation members of each hinge in position.

DESCRIPTION OF THE INVENTION

Figure 1:
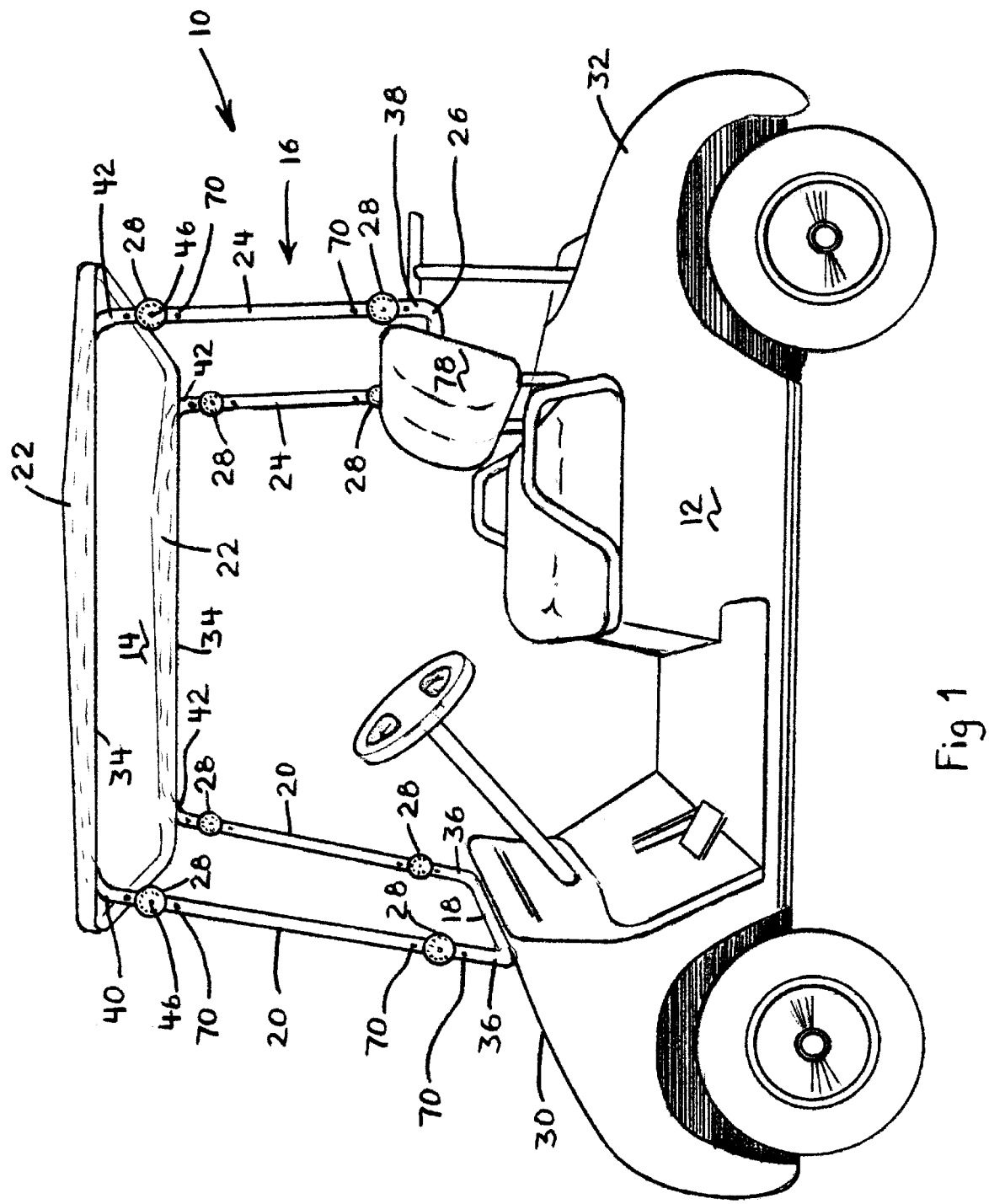
FIG. 1 is a side view of a golf cart with a foldable top according to the present invention.
Figure 2:
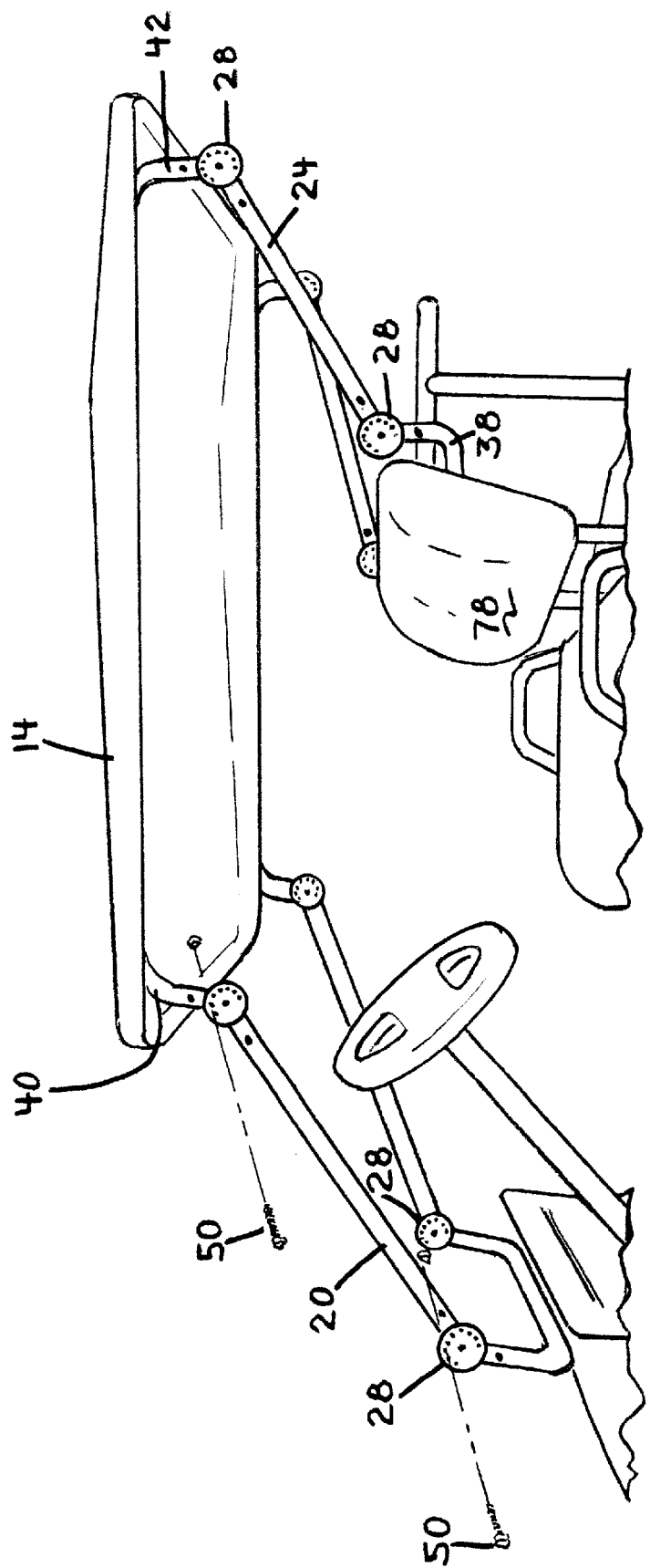
FIG. 2 is a side perspective view of the foldable top being folded according to the present invention.
Figure 3:
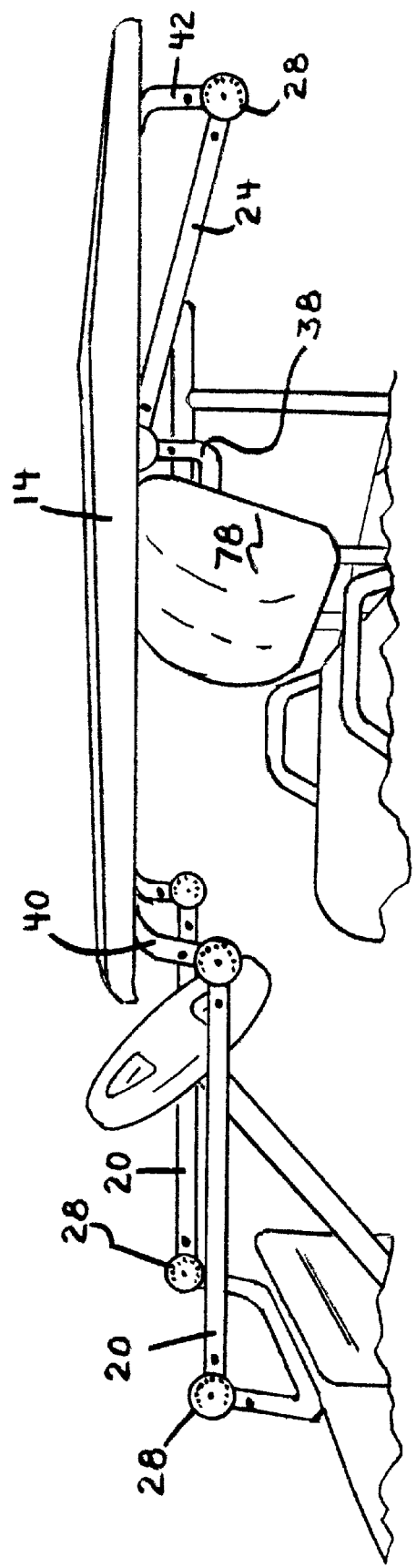
FIG. 3 is a side perspective view of the foldable top folded down according to the present invention.

The present invention is a foldable top 10 on a golf cart 12, as shown in FIGS. 1–3. The foldable top 10 includes a top 14 and a framework 16. The framework 16 is attached to the golf cart 12 and supports the top 14. The framework 16 includes a front bottom frame 18, two front middle frames 20, two top frames 22, two rear middle frames 24, a rear bottom frame 26 and a series of hinges 28. Each frame 18–26 is typically made from tubular stock which can be of a round or square variety. The examples shown in the FIGS. 1–3 and 6 are of the square variety. The front bottom frame 18 is attached to the front 30 of the golf cart 12. The rear bottom frame 26 is attached to the rear 32 of the golf cart 12. The two top frames 22 are attached to sides 34 of the top 14. The front and rear bottom frames 18, 26 are shown as one piece units having front legs 36 and rear legs 38, respectively, on either side of the golf cart 12. Whereby, the front and rear legs 36, 38 extend upward in a near vertical position. The top frames 22 are shown as one piece units on each side of the golf cart 12. Whereby, each top frame 22 includes a front top leg 40 and a rear top leg 42, of which, both extend downward in a near vertical position. The front and rear bottom frames 18, 26, along with the top frames 22, could be replaced by tubular legs (not shown), which individually extend from the golf cart 12 and the top 14.

Figure 4:
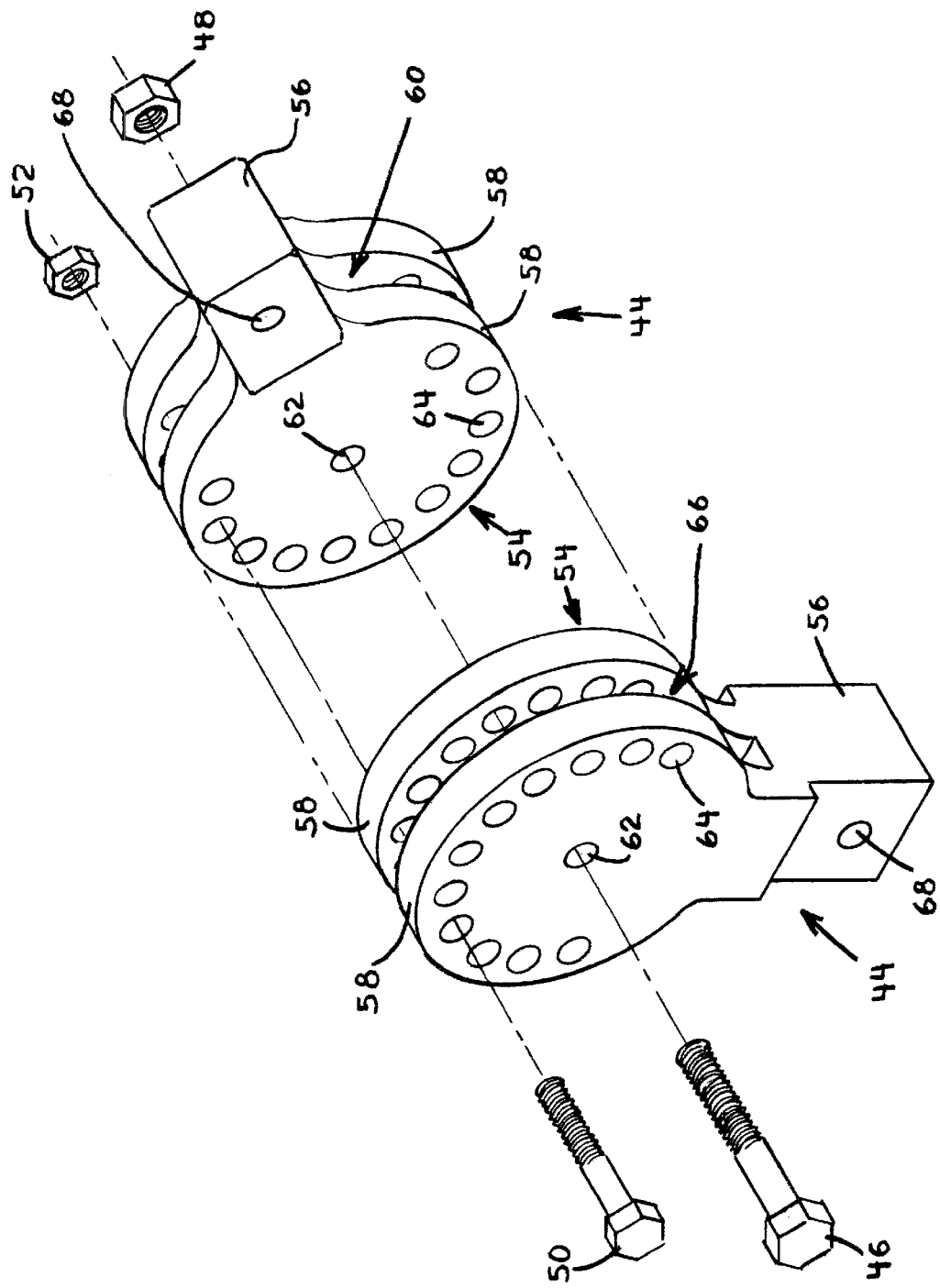
FIG. 4 is an exploded view of a hinge according to the present invention.
Figure 5:
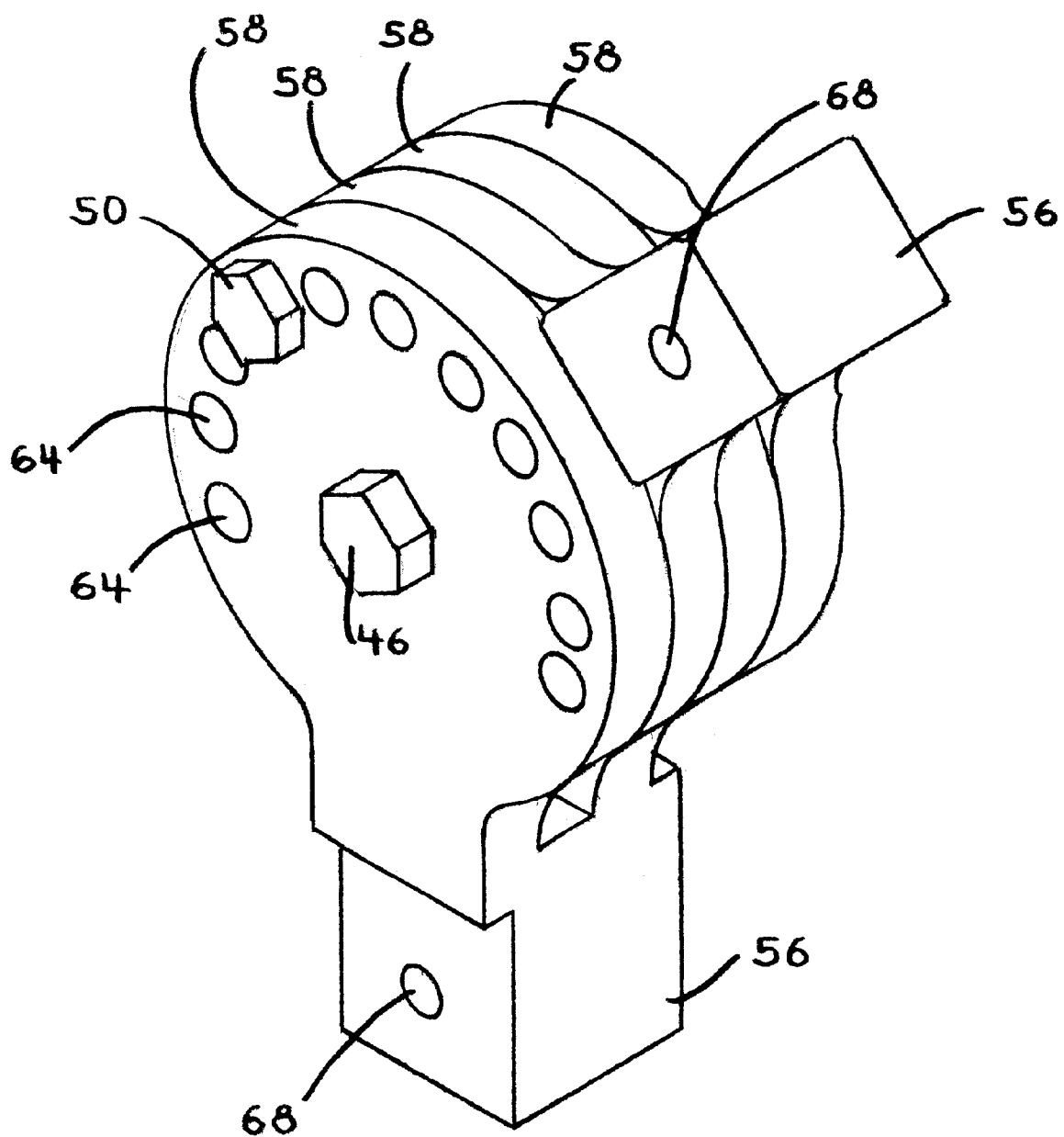
FIG. 5 is a perspective view of the hinge shown in FIG. 4 assemble according to the present invention.
Figure 6:
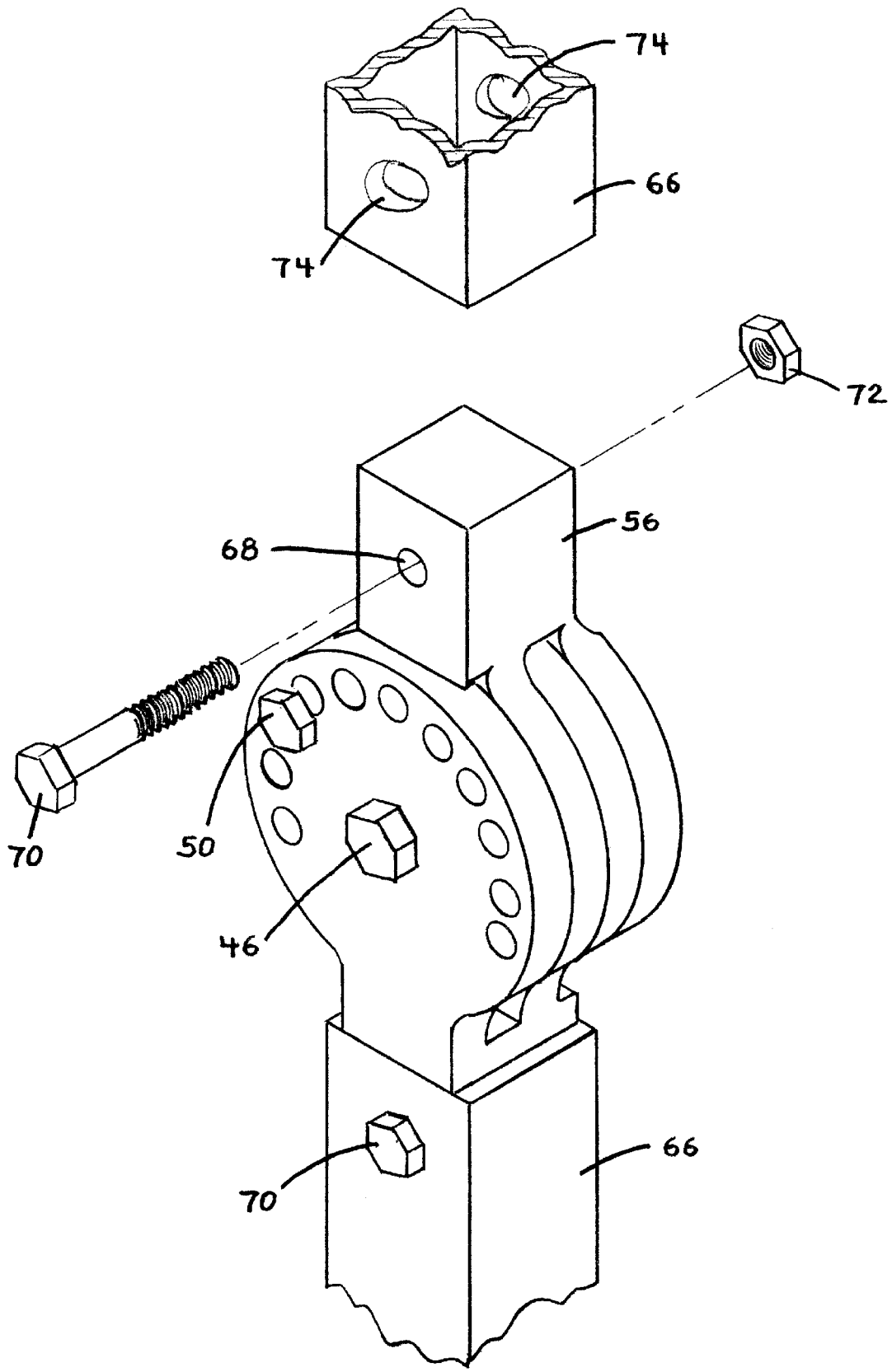
FIG. 6 is a perspective view of the hinge shown in FIG. 4 attached to framework according to the present invention.

The front middle frames 20 are attached to the front bottom frame 18 using a hinge 28 between the front middle frames 20 and the front legs 36. The front middle frames 20 are also attached to the top frame 22 using a hinge 28 between the front middle frames 20 and the front top legs 40. The rear middle frames 24 are attached to the rear bottom frame 26 using a hinge 28 between the rear middle frames 24 and the rear legs 38. The rear middle frames 24 are also attached to the top frame 22 using a hinge 28 between the rear middle frames 24 and the rear top legs 42. The hinge 28 is shown in FIGS. 1–6. FIG. 4 shows the components of the hinge 28. The hinge 28 includes two rotation members 44, center bolt 46 with a nut 48 and at least one positioning bolt 50 with a nut 52. Each rotation member 44 includes a head assembly 54 and a stud 56 extending from the head assembly 54. The head assembly 54 includes two rounded heads 58 with a gap 60 between the heads 58 to accept one of the heads 58 from the other rotation member 44. The two heads 58 of each rotation member 44 each include a center hole 62. The center hole 62 of one head 58 is aligned with the center hole 62 of the other head 58. Also, the center holes 62 of one rotation member 44 aligns with the center holes 62 of the other rotation member 44, when assembled. The two heads 58 of each rotation member 44 each include positioning holes 64. The positioning holes 64 of one head 58 is aligned with the positioning holes 64 of the other head 58 on the same rotation member 44. The location of the positioning holes 64 on the heads 58 can be the same for both rotation members 44 or different on each rotation member 44. The hinge 28 is assembled by inserting one of the heads 58 of each rotation member 44 into the gap 60 formed by the two heads 58 of the other rotation member 44, as shown in FIGS. 3–6. The center bolt 46 is then inserted through all of the center holes 62 of both rotation members 44 and secured with the nut 48. The nut 48 is only tighten enough to secure the center bolt in place and allow rotation of the rotation members 44 about the center hole 62. The studs 56 of each rotation member 44 are shaped to fit into the tubing of the framework 16. In this case, the studs 56 are shown as a square shape to fit into the square tubing 66 shown in FIG. 6. Each stud 56 includes fastening hole 68. When assembling the hinge 28 between the frames 18, 26 as shown, the stud 56 is inserted into the tubing 66. The hinges 28 are secured to the frames 18, 26 by a hinge bolt 70 and nut 72, as shown in FIG. 6. Whereby, the frames 18, 26 include frame holes 74 to receive the hinges bolts 70. The positioning bolt 50 and nut 52 are for securing the hinge 28 in a position and preventing rotation of the rotation members 44. Therefore, locking the hinge 28 in a locked position.

Operation of the foldable top 10 is as follows. When the foldable top 10 is assembled on the golf cart 12 as shown in FIG. 1, the hinges 28 are in a locked position and the front and rear middle frames 20, 24 are in a near vertical position. To fold the foldable top 10, simply remove the positioning bolts 50 from each hinge 28 to allow the rotation members 44 to rotate. Then, as shown in FIG. 2, push the top 14 towards the back of the golf cart 12, such that the rotation members 44 rotate and allow the top 14 to move downwards against the golf cart 12 as it moves to the rear. Keep moving the top 14 rearward, until the top 14 is in its lowest position. The top 14 moves downward because the front and rear middle frames 20, 24 move from a near vertical position to an almost horizontal position. In the case shown in FIG. 3, the top 14 comes to rest on a seat 78 of the golf cart 12. If the positioning holes 64 are properly placed, the hinges 28 can be locked in place using the positioning bolts 50 and nuts 52. This allows the top 14 to be secured in the down position for transport.

The positioning holes 64 shown in FIGS. 3–6 allow the locked position of the hinge 28 to be adjustable. It is not necessary to have more than two sets of positioning holes 64 to lock the top 14 in an up or down position. The additional positioning holes 64 allow for the same hinge 28 to be used on golf carts 12 made by different manufactures. This adjustability of the hinge 28 is needed as the front and rear legs 36, 38 might extend at different angles from the golf cart 12, depending on the manufacture and body style of the golf cart 12. In fact the positioning holes 64 might be spaced differently on one head assembly 54 of the rotation member 44 as compared to the other rotation member 44 of a hinge 28 to accommodate for manufacture's differences of the golf cart 12. Also, rivets or other fasteners can be use to replace the various bolts and nuts describe to fasten the hinge 28 and framework 16 together. It is envisioned that the foldable top 10 could be used on other types of vehicles.

While different embodiments of the invention has been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention which is to be given the full breadth of any and all equivalents thereof.

I claim:

1. A foldable top for a vehicle comprising:
   a framework extending upward from the vehicle, said frame work having at least one bottom frame attached to the vehicle and at least one top frame extending upward from said bottom frame;
   a top attached to said top frame for protecting occupants of the vehicle;
   a plurality of hinges as part of said framework which allows said top to be folded down against the vehicle when the vehicle is not in use;
   wherein there is a front bottom frame and a rear bottom frame; wherein said front bottom frame is attached in a front area of the vehicle and said rear bottom frame is attached in a rear area of the vehicle; wherein there are two top frames and each of said top frames having a front and a rear; wherein there are two front middle frames and two rear middle frames connected between said bottom and top frames for supporting said top frames above said bottom frames; wherein said plurality hinges includes eight hinges; wherein two of said hinges connects each of said front middle frames to said front bottom frame; wherein two of said hinges connects each of said rear middle frames to said rear bottom frame; wherein two of said hinges connects each of said front middle frames to said front of each of said top frames; and wherein two of said hinges connects each of said rear middle frames to said rear of each of said top frames.

2. A foldable top for a vehicle comprising:
   a framework extending upward from the vehicle, said frame work having at least one bottom frame attached to the vehicle and at least one top frame extending upward from said bottom frame;
   a top attached to said top frame for protecting occupants of the vehicle;
   a plurality of hinges as part of said framework which allows said top to be folded down against the vehicle when the vehicle is not in use;
   wherein each of said hinges comprises:
      two rotation members, each of said rotation members including a center hole, at least one positioning hole and a stud for attaching said rotation member to one of said frames;
      a center bolt inserted into said center hole to rotatably connect said two rotation members of each said hinge; and
      at least one positioning bolt inserted into at least one positioning hole of each of said rotation members to secure said two rotation members of each said hinge in position.

3. The foldable top of claim 2, wherein each of said rotation members include a plurality of positioning holes to allow adjustment of said position that said rotation members are secured.

4. The foldable top of claim 2, wherein each rotation member includes a head assembly and said stud extends from said head assembly; wherein each of said head assemblies include two heads, a gap between said heads to accept one of said heads from the other said rotation member of said hinge; wherein each of said heads of each said rotation member each include said center hole; wherein each of said center holes of each of said head assemblies are aligned to receive said center bolt to allow rotation of said rotation members of said hinge; wherein each of said heads of each of said rotation member each include said at least one positioning hole; and wherein each of said at least one positioning holes of each of said head assemblies are aligned to receive said at least one positioning bolt to allow said rotation members to be secured in position.

5. The foldable top of claim 4, wherein each of said heads of said head assemblies include a plurality of aligned positioning holes to allow adjustment of rotation members position.

6. The foldable top of claim 2, wherein a front part of said bottom frame includes two ends and a rear part of said bottom frame includes two ends; wherein each of said ends includes a leg extending upward towards said top to receive a stud from one of said hinges.

7. The foldable top of claim 6, wherein each rotation member includes a head assembly and said stud extends from said head assembly; wherein each of said head assemblies include two heads, a gap between said heads to accept one of said heads from the other said rotation member of said hinge; wherein each of said heads of each said rotation member each include said center hole; wherein each of said center holes of each of said head assemblies are aligned to receive said center bolt to allow rotation of said rotation members of said hinge; wherein each of said heads of each of said rotation member each include said at least one positioning hole; and wherein each of said at least one positioning holes of each of said head assemblies are aligned to receive said at least one positioning bolt to allow said rotation members to be secured in position.

8. The foldable top of claim 7, wherein each of said rotation members include a plurality of positioning holes to allow adjustment of said position that said rotation members are secured.

9. A foldable top for a golf cart comprising:
   a framework extending upward from the golf cart, said frame work having at least one bottom frame attached to the golf cart and at least one top frame extending upward from said bottom frame;
   a top attached to said top frame for protecting occupants of the golf cart;
   a plurality of hinges as part of said framework which allows said top to be folded down against the golf cart when the golf cart is not in use;
   wherein there is a front bottom frame and a rear bottom frame; wherein said front bottom frame is attached in a front area of the golf cart and said rear bottom frame is attached in a rear area of the golf cart; wherein there are two top frames and each of said top frames having a front and a rear; wherein there are two front middle frames and two rear middle frames connected between said bottom and top frames for supporting said top frames above said bottom frames; wherein said plurality hinges includes eight hinges; wherein two of said hinges connects each of said front middle frames to said front bottom frame; wherein two of said hinges connects each of said rear middle frames to said rear bottom frame; wherein two of said hinges connects each of said front middle frames to said front of each of said top frames; and wherein two of said hinges connects each of said rear middle frames to said rear of each of said top frames.

10. A foldable top for a golf cart comprising:
    a framework extending upward from the golf cart, said frame work having at least one bottom frame attached to the golf cart and at least one top frame extending upward from said bottom frame;
    a top attached to said top frame for protecting occupants of the golf cart;
    a plurality of hinges as part of said framework which allows said top to be folded down against the golf cart when the golf cart is not in use;
    wherein each of said hinges comprises:
       two rotation members, each of said rotation members including a center hole, at least one positioning hole and a stud for attaching said rotation member to one of said frames;
       a center bolt inserted into said center hole to rotatably connect said two rotation members of each said hinge; and
       at least one positioning bolt inserted into at least one positioning hole of each of said rotation members to secure said two rotation members of each said hinge in position.

11. The foldable top of claim 10, wherein each of said rotation members include a plurality of positioning holes to allow adjustment of said position that said rotation members are secured.

12. The foldable top of claim 10, wherein each rotation member includes a head assembly and said stud extends from said head assembly; wherein each of said head assemblies include two heads, a gap between said heads to accept one of said heads from the other said rotation member of said hinge; wherein each of said heads of each said rotation member each include said center hole; wherein each of said center holes of each of said head assemblies are aligned to receive said center bolt to allow rotation of said rotation members of said hinge; wherein each of said heads of each of said rotation member each include said at least one positioning hole; and wherein each of said at least one positioning holes of each of said head assemblies are aligned to receive said at least one positioning bolt to allow said rotation members to be secured in position.

13. The foldable top of claim 12, wherein each of said rotation members include a plurality of positioning holes to allow adjustment of said position that said rotation members are secured.

14. The foldable top of claim 10, wherein said front bottom frame includes two ends and said rear bottom frame includes two ends; wherein each of said ends includes a leg extending upward towards said top to receive a stud from one of said hinges.

15. The foldable top of claim 14, wherein each rotation member includes a head assembly and said stud extends from said head assembly; wherein each of said head assemblies include two heads, a gap between said heads to accept one of said heads from the other said rotation member of said hinge; wherein each of said heads of each said rotation member each include said center hole; wherein each of said center holes of each of said head assemblies are aligned to receive said center bolt to allow rotation of said rotation members of said hinge; wherein each of said heads of each of said rotation member each include said at least one positioning hole; and wherein each of said at least one positioning holes of each of said head assemblies are aligned to receive said at least one positioning bolt to allow said rotation members to be secured in position.

16. The foldable top of claim 15, wherein each of said rotation members include a plurality of positioning holes to allow adjustment of said position that said rotation members are secured.

* * * * *